United States Patent [19]

Shiraki et al.

[11] Patent Number: 4,651,041
[45] Date of Patent: Mar. 17, 1987

[54] ELECTRIC MOTOR

[75] Inventors: Manabu Shiraki, Yamato; Hiroyuki Amano, Kariya; Tomoaki Nishimura; Katsumasa Shimizu, both of Toyoake, all of Japan

[73] Assignee: Aisin Seiki Kabushiki Kaisha, Kariya, Japan

[21] Appl. No.: 847,788

[22] Filed: Apr. 3, 1986

[30] Foreign Application Priority Data

Apr. 4, 1985 [JP] Japan .................................. 60-71661

[51] Int. Cl.$^4$ ......................... H02K 1/00; F16K 31/02
[52] U.S. Cl. ..................................... 310/180; 310/156;
    310/268; 310/66; 251/129.02; 261/DIG. 74
[58] Field of Search ............... 310/156, 254, 258, 268,
    310/179, 180, 194, 66; 251/129, 133, 134, 305;
    261/DIG. 74; 123/188 R, 190 R

[56] References Cited

U.S. PATENT DOCUMENTS

| | | | |
|---|---|---|---|
| 4,093,897 | 6/1978 | Fujita et al. | 310/268 X |
| 4,283,644 | 8/1981 | Kondo et al. | 310/254 X |
| 4,315,177 | 2/1982 | Ban et al. | 310/254 |
| 4,321,496 | 3/1982 | Hickey | 310/179 |
| 4,394,594 | 7/1983 | Schmider et al. | 310/268 X |
| 4,437,029 | 3/1984 | Ban et al. | 310/268 X |
| 4,601,271 | 7/1986 | Ejiri et al. | 123/361 |

FOREIGN PATENT DOCUMENTS 59-70174  4/1984  Japan .

Primary Examiner—Mark O. Budd
Attorney, Agent, or Firm—Sughrue, Mion, Zinn, Macpeak & Seas

[57] ABSTRACT

An electric motor for controlling the tilt of a throttle valve is disclosed. A rotatable field magnet having at least two pairs of N and S poles is mounted on a rotary shaft carrying the throttle valve for rotation relative to a disk-shaped stator yoke having at least one armature coil formed therearound. The coil includes a first toroidal windings of conductor effective for the development of torque wound in one direction and a second toroidal windings of conductor similarly effective for the development of torque wound in the other direction and disposed away from said first toroidal windings of conductor circumferentially of the stator yoke at an angular interval which is equal to about 2n−1 times the pole-to-pole interval of said magnet, said first and second windings being electrically connected to each other. The first and second windings of conductor are phase shifted in spaced-apart relation to each other. Further, a spring is provided which act to urge the rotatable shaft in the direction which will cause the throttle valve to tilt to its "closed" position.

6 Claims, 3 Drawing Figures

ELECTRIC MOTOR

FIELD OF THE INVENTION

The present invention relates to an electric motor. More specifically, it relates to an apparatus for driving a throttle valve for use in an automotive internal combustion engine and controlling the tilt thereof.

BACKGROUND OF THE INVENTION

Apparatus for controlling the tilt of a throttle valve adapted for use in an automotive internal combustion engine by means of an electrical device such as motor can make possible adjustment of the throttle valve in response not only to the operation of the accelerator pedal in driver's compartment, but also to various factors, e.g., varying conditions of engine. Thus, such apparatus can offer a wide range of application opportunities in designing automotive engines.

One such apparatus for controlling the throttle valve is disclosed by laid-open Japanese Patent Application No. 58-13135 (1983), wherein a throttle valve is connected to a control lever which is in turn connected operatively by way of a reduction gearing to an electric motor, and a spring is provided in such a way to urge the valve toward its "closed" "throttling off" position. The motor, when energized, causes the throttle valve to tilt for controlling the opening of an air passage in which the valve is tiltably mounted. With such an arrangement of the apparatus, in the event of failure in power supply to the motor for any reason, it will be brought to a stop at a position where the supply of power is shut off. Though the spring then acts on the throttle valve to return it to its original position, the motor itself will offer substantial resistance against the action of the return spring. Additional resistance is offered by the reduction gearing which is connected to the valve control lever. In this way, the apparatus according to the prior art has had a drawback in that the throttle valve will be substantially locked in its "opened" position if power to the motor is turned off. To put in other words, the throttle valve should preferably be brought back to its "throttling" position as soon as the motor is de-energized.

In view of the requirement that the throttle valve in operation only has to tilt or turn through an angle of about 90 degrees, an ordinary motor of any known type, if used for tilt adjustment of the valve, will have more component parts than necessary for the desired controlling. Apparatus for controlling the throttle valve designed for use, e.g., in an automobile, is required to operate with a quick response and the motor therefor should preferaby be a DC motor, accordingly. Furthermore, the motor should be as compact as possible for the sake of improvement in space factor, and a brushless type is desirable to accomplish prolonged period of serviceable life, trouble-free operation and ease of maintenance.

In view of the application of the motor for adjustment of the tilt of a throttle valve adapted for use in an automotive internal combustion engine, it is desirable to provide the motor capable of producing sufficiently high output torque in connection with various influencing factors, such as air pressure, urging force of return spring, etc.

SUMMARY OF THE INVENTION

Therefore, an object of the present invention is to provide a coreless and brushless type motor adapted for use for controlling the tilt of a throttle valve, which can remove the aforementioned drawback.

Another object of the present invention is to provide a motor which can produce sufficiently high torque without adding to its size and realize ease of maintenance and prolonged period of serviceable life.

According to the present invention, a rotatable field magnet having at least two pairs of N and S poles is mounted on a rotary shaft carrying a throttle valve and disposed in face-to-face relation to and rotatable relative to a disk-shaped stator armature having at least one armature coil formed therearound. The coil has a first toroidal windings of conductor effective for development of torque wound in one direction and a second toroidal windings of conductor, similarly effective for the development of torque, disposed away from said first toroidal windings of conductor circumferentially of the stator armature at an angular interval which is equal to about "2n−1" times the pole-to-pole interval of said magnet (wherein the value for "n" is an integer) and wound in the other direction, said first and second windings of conductor being electrically operatively connected to each other to form said coil. In addition, a spring is provided which act to urge the rotatable shaft in the direction which will cause the throttle valve to tilt to its "throttling" position.

In this way, because the motor of such a brushless type is coupled directly to a rotary shaft carrying the throttle valve to dispense with any reduction gearing, the motor becomes substantially free when it is de-energized so that it can be moved back automatically to its original "throttling" position with great smoothness by the action of the return spring.

In addition, toroidally winding the conductor into a coil can make possible utilization of both sides of the stator armature, thus offering advantages in armature's winding utilization factor and volumetric efficiency and simultaneously realizing development of higher output torque. Furthermore, the armature coil according to the invention has only extremely small amount of portion that contributes little to the development of output torque, the loss of the coil can be minimized and, therefore, the motor can operate with improved efficiency.

According to still another feature of the present invention, a plurality of windings of coils can be arranged with no overlapped portion of coils, thus making it possible to maintain the air gap between the stator armature and the field magnet at minimum, with the result that higher output torque with reduced rippling can be produced.

These and other objects, advantages and features of the present invention will become more apparent by reference to the following description taken in conjunction with the accompanying drawings.

DETAILED DESCRIPTION OF PREFERRED EMBODIMENT

Figure 1:
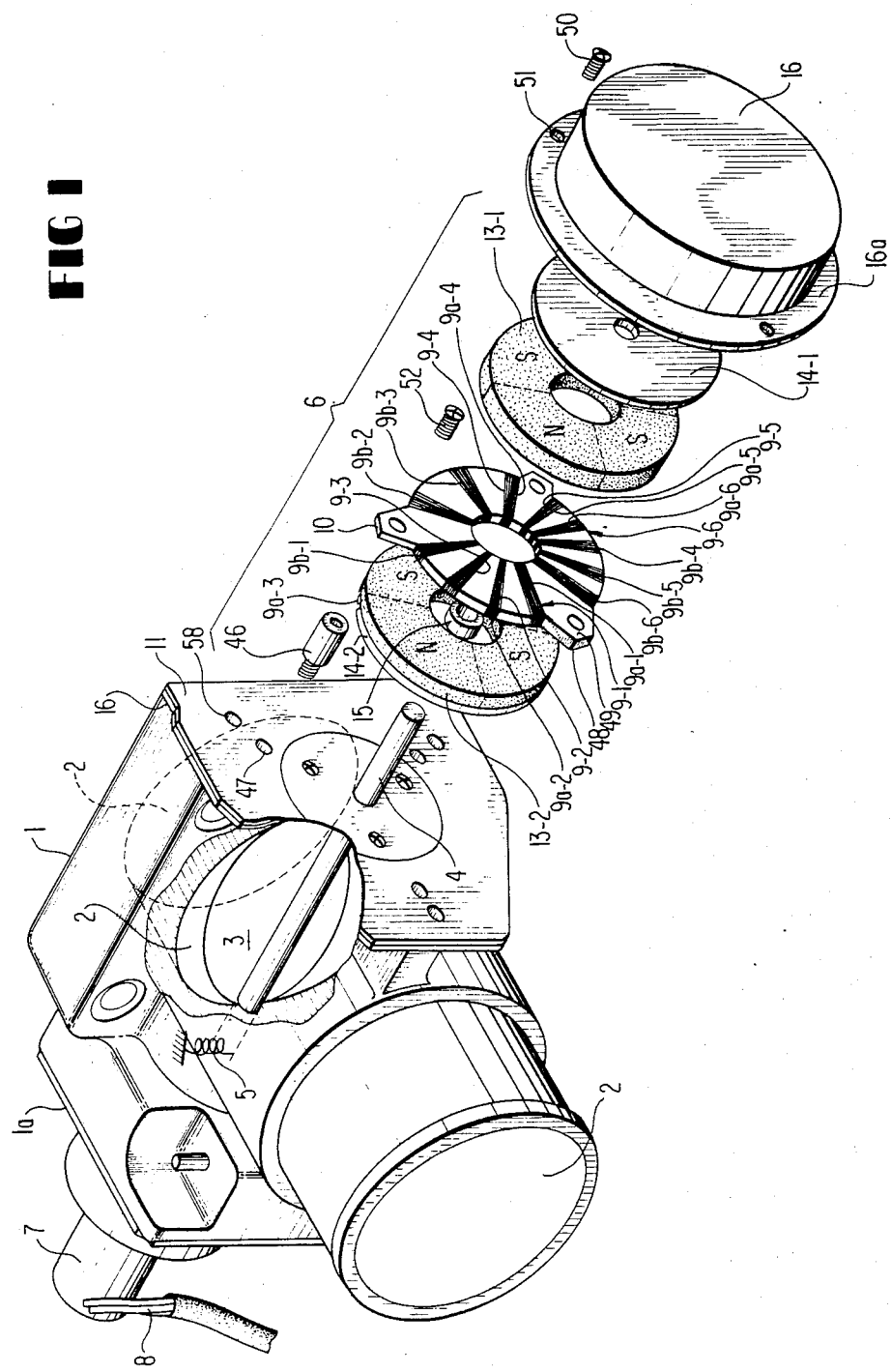
FIG. 1 is a perspective view, partly exploded and broken showing a preferred embodiment of the apparatus constructed in accordance with the present invention.

Referring to FIG. 1, a throttle valve body shown generally by a reference numeral 1 has a cylindrical air passage 2 formed therethrough. In the air passage 2, a throttle valve 3 in the form of a circular disk which is adapted to close the passage 2, or to throttle the air flowing therethrough, is supported by a rotary shaft 4 extending perpendicularly to the central axis of the air passage. The throttle valve 3 thus supported rotatably by the shaft 4 is placed normally under the influence of a spring 5 which acts on the shaft in such a way that the throttle valve may be tilted to close the air passage 2. In operation of the apparatus, the throttle valve 3 is driven to rotate by a drive, or a motor 6 which is to be described in detail in later part hereof, by way of the shaft 4 in such a way to adjust the tilt of the valve for adjusting the opening of the air passage 2 and hence the flow of air passing therethrough.

As shown in FIG. 1, the rotary shaft 4 is fixed on the diametral bisector line on the circular disk of the throttle valve 3 by any suitable means so that the shaft is rotated integrally with the valve. The shaft 4 is journalled at its opposite ends by any suitable bearing means (not shown) mounted in the throttle valve body 1, with the extension from one end of the shaft connected to a rotary shaft (not shown) of a valve tilt detecting device 7 which is fixedly mounted to a lateral side 1a of the valve body 1. Alternatively, the rotary shaft 4 carrying the throttle valve 3 and the counterpart of the detecting device 7 may share a single common shaft. The tilte detector 7 includes a potentiometer, tachogenerator, encoder or any other suitable means which is adapted to produce and transmit through leads 8 a single representing the degree of tilt of the throttle valve 3 then positioned, or the current opening of the air passage 2. The signal is transmitted to a control means which controls the ON-OFF operation of and the supply current to the motor 6 according to the input signals so as to adjust the tilt of the throttle valve 3 as required.

The other end of the rotary shaft 4 opposite to the counterpart connected to the shaft of the valve tilt detector 7 is extended to be utilized as a common shaft of the motor 6. Lateral side 1b of the throttle valve body 1 adjacent to the motor 6 has a stator yoke 11 of magnetic material attached thereto, and the surface of this stator yoke 11 is properly insulated. It is preferable that the surface should be formed with a printed circuit having the desired wiring pattern by using etching or any other convenient methods.

An assembly of the aforementioned valve drive motor 6 is fixedly mounted onto the surface of the stator yoke 11 on the lateral surface 1b of the body 1. As indicated in FIG. 1, in particular in its exploded view, the major component parts of said motor 6 includes said stator yoke 11, a stator armature 12 fixed stationary to the stator yoke 11, an extension of the rotary shaft 4, field magnets 13-1, 13-2, a stator armature 12 fixed to the stator yoke and flanked by the field magnets, rotor yokes 14-1, 14-2, a connecting member 15, and a housing 14. The stator armature 12 has six windings of coils 9-1, 9-2, 9-3, 9-4, 9-5 and 9-6 each formed around a ring-shaped stator yoke 10. Because each of the coils 9-1, 9-2, 9-3, etc. has two toroidally wound conductor portions which effectively contribute to the development of torque, a total of twelve toroidal conductor portions is disposed equidistantly on the stator yoke 10. These effective conductor portions are designated in FIG. 1 and FIG. 2 by paired reference numerals 9a-1 and 9b-1, 9a-2 and 9b-2, 9a-3 and 9b-3, 9a-4 and 9b-4, 9a-5, and 9b-5, and 9a-6 and 9b-6, and such paired conductor portions constitute the armature coils 9-1, 9-2, 9-3, 9-4, 9-5 and 9-6, respectively.

As shown in FIG. 1 and also in the expanded view of FIG. 2, the conductor portions of each pair constituting an armature coil, e.g. 9a-1, and 9b-1, 9a-2 and 9b-2, 9a-3 and 9b -3, etc. constituting armature coils 9-1, 9-2, 9-3, etc, respectively, are spaced apart from each other at an angular interval of 90 degrees circumferentially of the ring-shaped yoke 10 and wound toroidally in opposite directions with their terminals connected as described in detail hereinafter. Thus, the stator armature 12 including six coils 9-1, 9-2, 9-3, etc. has a total of twelve effective conductor portions 9a-1, 9b-1, 9a-2, 9b-2, 9a-3, 9b-3, etc. disposed successively in toroidal windings at angular intervals of 30 degrees circumferentially around the ring-shaped disk of the yoke 10.

Figure 2:
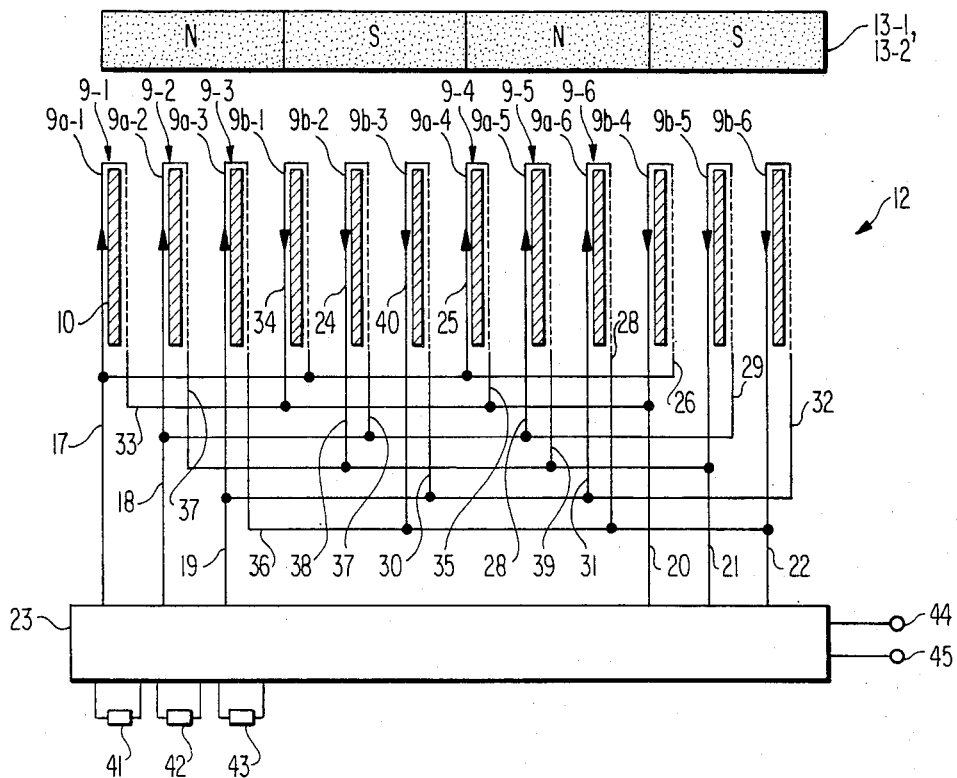
FIG. 2 is an illustrative expanded view showing the positional relationship between field magnets and their associated stator armature coils and the wiring of coil leads.

Reference being had to FIG. 2 showing terminal connection of windings of conductors, the leading terminals 17, 18 and 19 of windings of the conductor portions 9a-1, 9a-2, 9a-3, 9b-4, 9b-5 and 9b-6 are connected to an electrically-operated commutating device 23, respectively. The leading terminal 17 is connected to each of the trailing terminal 24 of conductor windings 9b-1, leading terminal 25 of conductor windings 9a-4, and trailing terminal 26 of conductor windings 9b-4. The leading terminal 18 is connected to each of the trailing terminal 27 of conductor windings 9b-2, leading terminal 28 of conductor windings 9a-5, and trailing terminal 29 of conductor windings 9b-5. The leading terminal 19 is connected to each of the trailing terminal 30 of conductor windings 9b-3, leading terminal 31 of conductor windings 9a-6, and trailing terminal 26 of conductor windings 9b-6. The trailing terminal 33 of the coil winding 9a-1 is connected to each of the leading terminal 34 of conductor windings 9b-1, trailing terminal 35 of conductor windings 9a-4, and leading terminal 20 of conductor windings 9b-4. The trailing terminal 37 of the coil winding 9a-2 is connected to each of the leading terminal 38 of conductor windings 9b-2, trailing terminal 39 of conductor windings 9a-5, and leading terminal 21 of conductor windings 9b-5. The trailing terminal 36 of the coil winding 9a-3 is connected to each of the leading terminal 40 of conductor windings 9b-3, trailing terminal 28 of conductor windings 9a-6, and leading terminal 22 of conductor windings 9b-6.

Elements 41, 42 and 43 (FIG. 2) are devices for detecting the change of magnetic poles, each, upon detecting such a change, producing a signal for controlling the flowing direction of currents to each pair of armature coils 9-1 and 9-4, 9-2 and 9-5, and 9-3 and 9-6. These devices 41, 42 and 43 are provided in the motor control circuit 101 (FIG. 3) and operatively connected to any suitable source of power (not shown) with their output terminals connected to the electric commutating device 23, respectively. The commutator 23 has negative and positive power terminals 44 and 45 connected thereto. The above elements 41, 42, 43 may include any suitable devices, e.g., Hall device or Hall IC.

The stator armature 12 having its coils 9-1, 9-2, 9-3, etc. wound around the disk-shaped yoke 10 is secured to the throttle valve body 1 by means of nuts 46 (only one is shown) screwed into threaded holes 47 formed in the stator yoke 11 and screws 52 passed through holes 49 formed in radially extending lug portions 48 of the stator yoke 10 and then threaded into the nuts 46.

As clearly shown in FIG. 1 and FIG. 2, each of the field magnets 13-1 and 13-2 is four-poled, disk-shaped, and has its N and S poles disposed alternately at angular intervals of 90 degrees. Such magnets 13-1 and 13-2 have the rotor yokes 14-1 and 14-2 attached to their outer faces, respectively, and are secured on the rotary shaft 4 by way of a ring-shaped connecting member 15 in such positions that the portions of like poles may face each other with the stator armature 12 interposed therebetween. Thus, the field magnets 13-1 and 13-2 are rotatable together with the shaft 4 and relatively to the stator armature 12. The rotor yokes 14-1 and 14-2 are attached on the outer surfaces of the field magnets 13-1 and 13-2 opposite to the armature 12, respectively, to close the magnetic circuits. The casing 14 is fastened to the stator yoke 11 by means of screws 50 (only one is shown) passed through holes 51 formed in flange portion 16a of the casing and then threaded into holes 53 formed in the stator yoke 11, for protecting major component parts, such as the stator armature 12 and field magnets 13-1, 13-2, of the motor 6.

Figure 3:
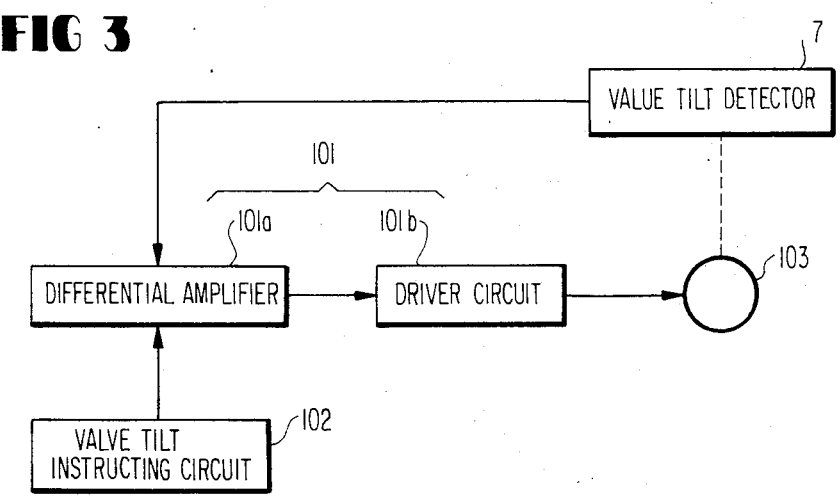
FIG. 3 is a block diagram showing schematically a control system for the motor of the present invention.

Reference is then made to FIG. 3 showing a block diagram of a control system for the motor 6. While the motor 6 is kept de-energized, the throttle valve 3 is held in a position where it closes the air passage 2, so that little is admitted therethrough. When a signal is produced by a circuit 102 which calls for a tilt of the throttle valve for any desired air flow and transmitted to a motor control circuit 101, the elements 41, 42 and 43 (FIG. 2) provided in said control circuit detects the pole position of the field magnet 13-1 or 13-2 and the armature coils 9-1, 9-2, 9-3, 9-4, 9-5 and 9-6 are then excited properly. Accordingly, torque is produced to rotate the field magnets 13-1 and 13-2 in the desired direction against the action of the return spring 5, thus effecting a start of the motor 6. While the motor is rotated, the electrically-operated commutating device 23 supplies excitation currents of appropriate directions to the armature coils 9-1, 9-2, 9-3, etc., respectively, while the changes of magnetic poles are being detected by the detecting devices 41, 42 and 43. The result is that the throttle valve 3 is tilted to open the air passage 2, thereby allowing air to flow through the passage. Simultaneously, a feedback signal representing the rotation of the shaft 4, hence the current tilt of the throttle valve 3, is transmitted from the valve tilt detector 7 to the motor control circuit 101 so that the tilt of the throttle valve may be adjusted properly. As shown in FIG. 3, the control circuit 101 includes a differential amplifier 101a and a driver circuit 101b.

When it becomes desired to throttle off the air, the control circuit 101 is operated then to de-energize the armature coils 9-1, 9-2, 9-3, etc. Consequently, the throttle valve 3 is tilted back to its original "throttling" position by the return spring 5.

While the invention has been described and illustrated specifically with reference to a desired embodiment, it is to be understood that the invention can be changed or modified without departing from the spirit or scope thereof.

What is claimed is:

1. In an apparatus including means defining an air passage, a throttle valve supported tiltably by a shaft extending across the axis of said air passage and adapted to open and close the passage, spring means for urging said throttle valve toward a position where said valve throttles off said air passage, and an electric motor connected operatively to said shaft, whereby said throttle valve is tiltable by said motor in a direction which causes the air passage to be opened by said throttle valve, said motor comprising a rotatable shaft coupled directly to said shaft supporting said throttle valve, field magnet means including at least one magnet having at least two pairs of N and S poles, and stator armature means including at least one coil of conductor, said coil having a first toroidal windings of conductor wound in one direction around a ring-shaped stator yoke and a second toroidal windings of conductor wound in the other direction and disposed away from said first windings of conductor circumferentially of said stator yoke at an angular interval which is equal to about "2n−1" times the interval between adjacent N and S poles of said magnet, said first and second windings of conductor being electrically connected to each other to form said one coil of said stator armature means, and said coil being positioned in face-to-face confronting relation to said field magnet means.

2. Apparatus according to claim 1, said field magnet means includes two said magnets which are disposed on opposite sides of said stator yoke with the portions thereof of like poles facing each other with said stator yoke interposed therebetween.

3. Apparatus according to claim 1, wherein said first and second toroidal windings of conductor of said coil are phase shifted in spaced-apart relation to each other.

4. Apparatus according to claim 1, wherein said stator armature means includes a plurality of said coils of conductor and said first and second toroidal windings of conductor of said plurality of coils are phase shifted in spaced-apart from each other.

5. Apparatus according to claim 1, further comprising means for detecting the current tilt of said throttle valve, means for instructing the desired tilt of said throttle valve, and means operable in conjunction with said detecting means and said instructing means for controlling the operation of said motor.

6. Apparatus according to claim 5, further comprising means for controlling the flowing of excitation current to said coil.

* * * * *